United States Patent
Anderson

(10) Patent No.: US 9,708,197 B2
(45) Date of Patent: Jul. 18, 2017

(54) SYSTEM AND METHOD FOR TREATING WATER OR WASTEWATER

(71) Applicant: Aerofloat (Holdings) Pty Ltd, Caringbah (AU)

(72) Inventor: Michael Patrick Anderson, Caringbah (AU)

(*) Notice: Subject to any disclaimer, the term of this patent is extended or adjusted under 35 U.S.C. 154(b) by 0 days.

(21) Appl. No.: 14/440,054

(22) PCT Filed: Dec. 24, 2014

(86) PCT No.: PCT/AU2014/001162
§ 371 (c)(1),
(2) Date: Apr. 30, 2015

(87) PCT Pub. No.: WO2015/103662
PCT Pub. Date: Jul. 16, 2015

(65) Prior Publication Data
US 2016/0016816 A1  Jan. 21, 2016

(30) Foreign Application Priority Data

Jan. 9, 2014 (AU) ................................ 2014900061

(51) Int. Cl.
| | | |
|---|---|---|
| C02F 1/24 | (2006.01) |
| B01D 43/00 | (2006.01) |
| B03D 1/02 | (2006.01) |
| B03D 1/24 | (2006.01) |
| B03D 1/14 | (2006.01) |
| C02F 103/00 | (2006.01) |
| C02F 103/32 | (2006.01) |

(52) U.S. Cl.
CPC ............... *C02F 1/24* (2013.01); *B01D 43/00* (2013.01); *B03D 1/02* (2013.01); *B03D 1/1406* (2013.01); *B03D 1/1431* (2013.01); *B03D 1/1475* (2013.01); *B03D 1/24* (2013.01); *C02F 2103/002* (2013.01); *C02F 2103/32* (2013.01); *C02F 2209/44* (2013.01); *C02F 2301/08* (2013.01)

(58) Field of Classification Search
None
See application file for complete search history.

(56) References Cited

U.S. PATENT DOCUMENTS 2,994,432 A     8/1961  Schluter
4,367,148 A  *  1/1983  Fulton ............... B01D 21/2433
                                                    210/115
(Continued)

FOREIGN PATENT DOCUMENTS

EP      770428 A1  *  5/1997
JP      01274893 A  *  11/1989
KR      100919367 B1    9/2009

*Primary Examiner* — Thomas M Lithgow
(74) *Attorney, Agent, or Firm* — Koppel, Patrick, Heybl & Philpott

(57) ABSTRACT

The present invention relates to a treatment system, apparatus, assembly, facility, cycle and/or method for the treatment of water or wastewater, in particular, a system, apparatus, assembly, facility, cycle and/or method for treating water or wastewater received at high flowrates (including in excess of approximately 200 L/min) through a series of two or more dissolved air flotation chambers.

22 Claims, 6 Drawing Sheets

(56) References Cited

U.S. PATENT DOCUMENTS

| | | | |
|---|---|---|---|
| 4,902,429 A * | 2/1990 | Carpenter | B03D 1/1431 |
| | | | 209/170 |
| 5,139,662 A | 8/1992 | Ozawa | |
| 5,693,222 A | 12/1997 | Galvan et al. | |
| 5,840,156 A * | 11/1998 | Hebert | B03B 13/00 |
| | | | 162/4 |
| 2012/0168385 A1 * | 7/2012 | Anderson | B03D 1/1431 |
| | | | 210/703 |

* cited by examiner

SYSTEM AND METHOD FOR TREATING WATER OR WASTEWATER

FIELD OF THE INVENTION

The present invention relates to a treatment system, apparatus, assembly, facility, cycle and/or method for the treatment of water or wastewater, in particular, a system, apparatus, assembly, facility, cycle and/or method for treating water or wastewater.

BACKGROUND OF THE INVENTION

In the field of wastewater treatment, great efforts are continuously being made to reduce the quantity and concentration of pollutants being discharged into rivers, lakes, surface and ground water supplies, etc. This is evidenced by more and stricter government regulations and requirements relating to wastewater treatment processes and discharges. The quantities of human waste requiring treatment are constantly and rapidly increasing. In the field of potable water purification, available surface and ground water sources are rapidly deteriorating due to pollution caused by contaminated runoff and contaminates generated by a growing population and their careless use of water and improper disposal of waste products.

For example, one area of current concern is the discharge of grey water into the Australian river system. House boats and other marine vessels are commonly used recreational vehicles for families and holiday makers. Under some regulations, grey water can be discharged into the river but some new regulations require appropriate treatment or storage of grey water. Treatment of water for human consumption is also an important area in which the present invention has application. There is also the industrial wastewater industry where wastewater from small industries (such as food processing industries) requires treatment.

The present Applicant is the owner of granted Australian patent 2010291882, incorporated by reference herein, relating to an apparatus and method for the treatment of water that has proven to be successful in the treatment of water and wastewater, including in the abovementioned applications. An exemplary embodiment of such apparatus is shown in FIGS. 1(a) to 1(d) which demonstrates sequential steps of a treatment cycle using the apparatus, referenced by numeral 100.

In the example shown, the apparatus 100 includes a feed pump 102 for transferring, under pressure, water or wastewater via a coagulation coil 104 (to which coagulant and flocculent is added using respective pumps 106 and 108) to a dissolved air flotation (DAF) chamber 110 having a submerged contact chamber 112 and an external pressurised dissolver 114 associated therewith.

The water or wastewater to be treated is pumped into the contact chamber together with air-saturated water from the dissolver 114 (which receives treated water from chamber 110 using recirculation pump 116) which degasses upon entry into the contact chamber 112 and forms bubbles which adhere to suspended matter in the water or wastewater, causing the suspended matter to float to the surface of the chamber. This is shown in FIGS. 1a and 1b. Treated effluent leaves the outlet pipe 118 which has associated therewith an effluent valve 120 which in FIGS. 1a and 1b is open. When valve 120 is closed, the water level in the chamber 110 rises and float material is discharged through the upper discharge line 122 into a waste tank (not shown), as shown in FIG. 1c. The apex shape at the top of the DAF chamber 110 directs float material upwardly into discharge line 122 and then outwardly along an outward extension of the discharge line 122, such flow referred to as a "funneling effect". When the valve 120 is open again, as shown in FIG. 1d, effluent continues to discharge through outlet pipe 118 and the cycle starts again.

In this example, the outlet pipe 118 causes water to flow into an inlet 124 of outlet pipework 126, wherein the height of the inlet dictates the liquid level in the chamber 110 when the valve 120 is open.

Apparatus such as that shown in FIGS. 1a-1d are adequate for treating wastewater flows up to a certain flowrate. The flow which can be treated is determined by the cross sectional surface area of the chamber 110. When the wastewater flowrate gets too high, the tank geometry requires that the DAF chamber height becomes too high for most practical applications. In addition, by increasing the cross sectional area (and hence the height), the "funneling effect" becomes less efficient as the cross sectional area becomes too large. As such, there is a need for a water or wastewater treatment apparatus capable of handling higher flowrates without necessarily increasing the cross sectional area and the height of the DAF chamber 110.

It is therefore an object of the present invention to overcome at least some of the aforementioned problems or to provide the public with a useful alternative.

SUMMARY OF THE INVENTION

According to an aspect, the present invention provides a water or wastewater treatment system or apparatus characterised by two or more dissolved air flotation chambers each including a submerged contact chamber for directing water entering the contact chamber to the surface of the dissolved air flotation chamber, first discharge pipework for float material associated with said two or more dissolved air flotation chambers, a feed pump means adapted to move water or wastewater into the contact chambers under pressure via a feed line, wherein the water or wastewater entering the contact chambers via the feed line includes suspended matter, a pressurised dissolver for saturating water with air, a recirculation pump means adapted to move treated water via a recirculation line from the dissolved air flotation chambers to the external pressurised dissolver and then back into the contact chambers, whereby air-saturated water from the dissolver degasses upon entry into the contact chambers and forms bubbles which adhere to said suspended matter causing the suspended matter to float to the surface of each chamber to form a layer of float material, and second discharge pipework for treated water associated with said two or more dissolved air flotation chambers, said second discharge pipework including a control valve which when closed prevents flow of treated water from the dissolved air flotation chambers for a predetermined time to thereby cause a liquid level in one or more of the chambers to rise and said float material to be discharged through said first discharge pipework.

In an embodiment, the feed line branches into separate lines that feed into each contact chamber.

In an embodiment, each said branch includes a back pressure device to ensure uniform flow into each contact chamber, and said back pressure device is an orifice plate assembly.

In an embodiment, each said branch includes an inlet control valve which when closed prevents flow of water or wastewater into the corresponding contact chamber/s. Alternatively, each said branch includes an inlet control valve which when closed prevents flow of water or wastewater into the corresponding contact chamber/s, followed by a back pressure device to ensure uniform flow into each contact chamber.

In an embodiment, when said control valve associated with the second discharge pipework is closed, the liquid level in each chamber having a closed inlet control valve at the corresponding feed line branch is not caused to rise.

In an embodiment, each inlet control valve associated with a feed line branch includes an automatic timer for opening and closing the valves at preset times.

In an embodiment, the control valve associated with the second discharge line includes an automatic timer for opening and closing the valve at preset times.

In an embodiment, the automatic timers are configured such that at the commencement of a treatment cycle, the inlet control valves of feed line branches associated with a first, second and any additional dissolved air flotation chamber/s are open, and the control valve associated with the second discharge pipework for treated water is open.

In an embodiment, the automatic timers are configured such that after a preset time, the control valve associated with the second discharge pipework is closed, and the inlet control valves associated with feed line branches of the second and any additional chambers are closed for a preset time, causing the liquid level in the first chamber to rise and float material in the first chamber to be discharged through the first float discharge pipework.

In an embodiment, the automatic timers are configured such that after a further preset time, the inlet control valve associated with the feed line branch of the second chamber opens and then the inlet control valve associated with the feed line branch of the first chamber closes for a preset time, causing the liquid level in the second chamber to rise and float material in the second chamber to be discharged through the first float discharge pipework.

In an embodiment, the automatic timers are configured such that after a further preset time, the control valve associated with the feed line branch of any additional chamber opens and then the control valve associated with the feed line branch of the previously open chamber closes for a preset time, causing the liquid level in the additional chamber to open, and wherein this process is repeated for each additional chamber.

In an embodiment, the automatic timers are configured such that after a further preset time, the control valves associated with the feed line branches of all chambers are open, and the control valve associated with the second discharge pipe for treated water is open.

In an embodiment, said pump means is in the form of a first positive displacement pump for pumping water or wastewater to said chambers, and said recirculation pump means is in the form of a second positive displacement pump for recirculating treated water via the recirculation line from the dissolved air flotation chambers into the contact chambers via the dissolver.

In an embodiment, said treatment cycle repeats until a signal is transmitted to the pumps to discontinue operation of the positive displacement pumps, wherein prior to the pumps discontinuing operation, the control valve associated with the second discharge pipework for treated water is closed and the liquid level in all chambers is caused to rise and float material in all chambers caused to be discharged through the first float discharge pipework.

In an embodiment, the means of at least flocculating said water is in the form of a flocculation chamber.

In an embodiment, said recirculation line branches into individual lines that feed each contact chamber with air-saturated water.

In an embodiment, each said recirculation branch includes a back pressure device to ensure uniform flow into each contact chamber, and each said back pressure device is an orifice plate assembly.

In an embodiment, the first discharge pipework includes individual branches from each dissolved air flotation chamber which join to form a single discharge line.

In an embodiment, an upper end of each chamber has an inverted funnel shape to direct float material through said individual float discharge pipework branches.

In an embodiment, said individual float discharge pipework branches are vented and extend substantially vertically from an apex of each chamber and then outwardly and downwardly to enable said discharge before joining said single line, wherein the outward extension of the branch defines a minimum level at which float material is discharged.

In an alternative embodiment, each vertical extension has associated therewith an exit control valve, such that when an exit control valve is closed, and the control valve associated with the second discharge pipework is also closed, only the chamber/s having an open exit control valve at the corresponding float discharge pipework branch will see float material discharged.

In an embodiment, said second discharge pipework for treated water includes a substantially vertical branch which is vented to atmosphere and a substantially horizontal branch extending from an upper end thereof which defines a liquid level in the chambers.

In an embodiment, said recirculation line extends from a bottom portion of each dissolved air flotation chamber, and said bottom portion includes a funnel shape to direct any suspended matter which accumulates in the bottom portion of the chamber into the recirculation line.

In an embodiment, at the commencement of a treatment cycle, the recirculation pump means is operated prior to the pump means to ensure that suspended matter which was not directed to the surface of each chamber in a previous cycle and which has accumulated at or towards the bottom of each chamber is drawn into the recirculation line prior to treated water discharging from each chamber.

In another aspect, the present invention provides a method or treatment cycle for water or wastewater, said method or treatment cycle characterised by pumping water or wastewater including contaminants via a feed line to two or more dissolved air flotation chambers, each said chamber including treated water, pumping said treated water to a pressurised dissolver and into the two or more dissolved air flotation chambers, thereby feeding said chambers with air-saturated water from the dissolver which causes said contaminants to float towards a top surface of water in each chamber, thereby forming a layer of float material, each chamber including a minimum discharge level above the top surface of water defining a height at which rising float material will exit each chamber into first discharge pipework, discharging treated water from each chamber via a second discharge pipework for treated water, discharging said float material by providing an automatic valve at said second discharge pipework for treated water, said valve configured to automatically close and prevent said discharge of treated water from at least one of the two or more chambers for a period of time during said treatment cycle and thereby cause the water level in said at least one chamber to rise above said minimum discharge level, and automatically open after a predetermined float material discharge period.

In an embodiment, the method or treatment cycle for water or wastewater further includes at a commencement of a treatment cycle, opening inlet control valves of feed line branches associated with a first, second and any additional dissolved air flotation chambers, and opening a control valve associated with the second discharge pipework for treated water.

In an embodiment, the method or treatment cycle for water or wastewater further includes after a preset time, closing the control valve associated with the second discharge pipework, and closing the inlet control valves associated with feed line branches of the second and any additional chambers for a preset time, causing the liquid level in the first chamber to rise and float material in the first chamber to be discharged through the float discharge pipework.

In an embodiment, the method or treatment cycle for water or wastewater further includes after a further preset time, opening the inlet control valve associated with the feed line branch of the second chamber and then closing the inlet control valve associated with the feed line branch of the first chamber for a preset time, causing the liquid level in the second chamber to rise and float material in the second chamber to be discharged through the first float discharge pipework.

In an embodiment, the method or treatment cycle for water or wastewater further includes after a further preset time, opening the inlet control valve associated with the feed line branch of an additional chamber and then closing the inlet control valve associated with the feed line branch of the previously opened chamber for a preset time, causing the liquid level in the additional chamber to rise, and repeating this step for any additional chambers.

In an embodiment, the method or treatment cycle for water or wastewater further includes after a further preset time, opening the inlet control valves associated with the feed line branches of all chambers, and opening the control valve associated with the second discharge pipework for treated water.

In an embodiment, the method or treatment cycle for water or wastewater further includes repeating the treatment cycle until such time that a signal is transmitted to a first positive displacement pump responsible for pumping water or wastewater through to said chambers and a second positive displacement pump responsible for recirculating water via said dissolver, to discontinue operation of the pumps.

In an embodiment, the method or treatment cycle for water or wastewater further includes, when said signal is transmitted to the positive displacement pumps and prior to the pumps discontinuing operation, closing the control valve associated with the second discharge pipework for treated water to thereby cause the liquid level in all chambers to rise and float material in all chambers to be discharged through the first discharge pipework, and then discontinuing operation of the feed pump.

In an embodiment, pumping treated water to the external pressurised dissolver is performed at the commencement of a treatment cycle prior to pumping water or wastewater to the dissolved air flotation chambers, to ensure that suspended matter which was not directed to the surface of the chambers in a previous treatment cycle and which has accumulated at or towards the bottom of the chambers is drawn into the recirculation line prior to treated water discharging from each chamber.

BRIEF DESCRIPTION OF THE FIGURES

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

In an aspect, the present invention relates to a plant, apparatus and/or system 10 for treating liquids such as water or wastewater 12 and which works on the principles of dissolved air flotation (DAF) as described in the background of the invention. In another aspect, the invention relates to a method and/or treatment cycle for treating liquids such as water or wastewater. The invention is intended for particular use in treating high liquid flow rates in the order of, but not limited to, 400 to 1600 liters per minute. By way of comparison, the Applicant's single-chamber treatment referenced and described in the background of the invention is used to treat water or wastewater flowrates of approximately 200 liters per minute. It is to be understood that reference herein to "high liquid flowrates" is intended to define flowrates in excess of approximately 200 liters per minute which single chamber treatment facilities such as that shown in FIGS. 1a-1d may have difficulty handling for reasons already described in the background of the invention.

Figure 1B:
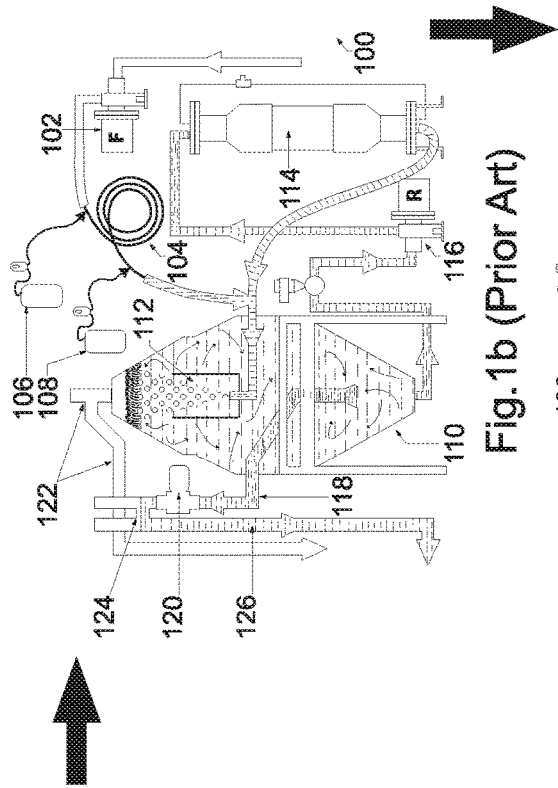
FIGS. 1a-1d illustrate schematically the cycle stages of a prior art water or wastewater treatment apparatus including a single dissolved air flotation chamber.
Figure 1C:
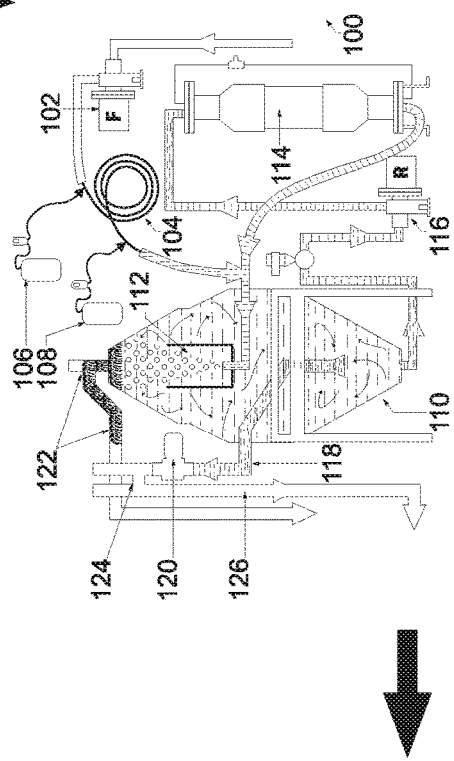
Figure 1A:
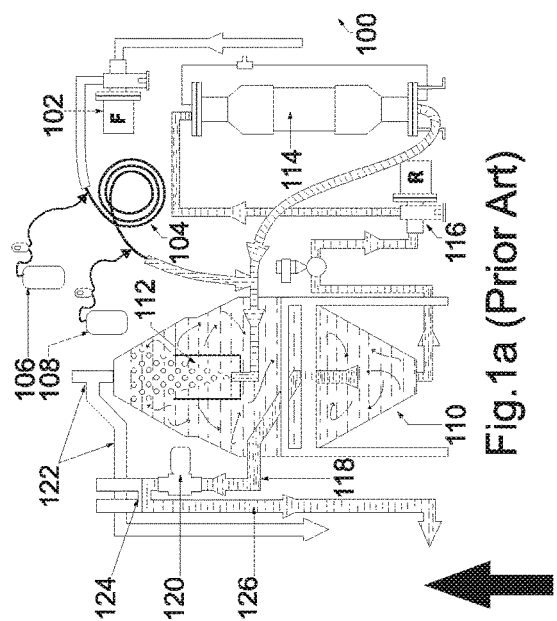
Figure 1D:
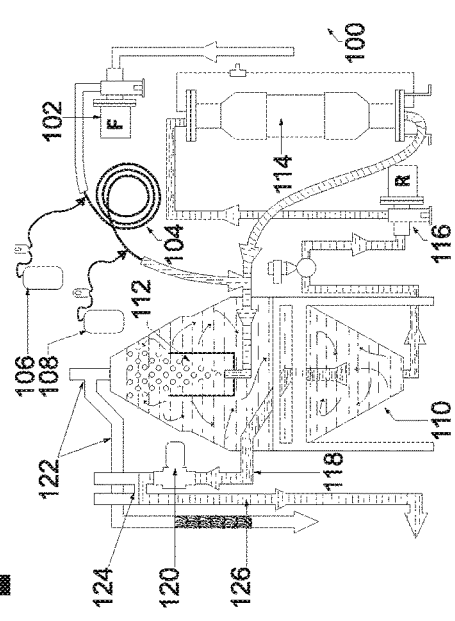
Figure 2:
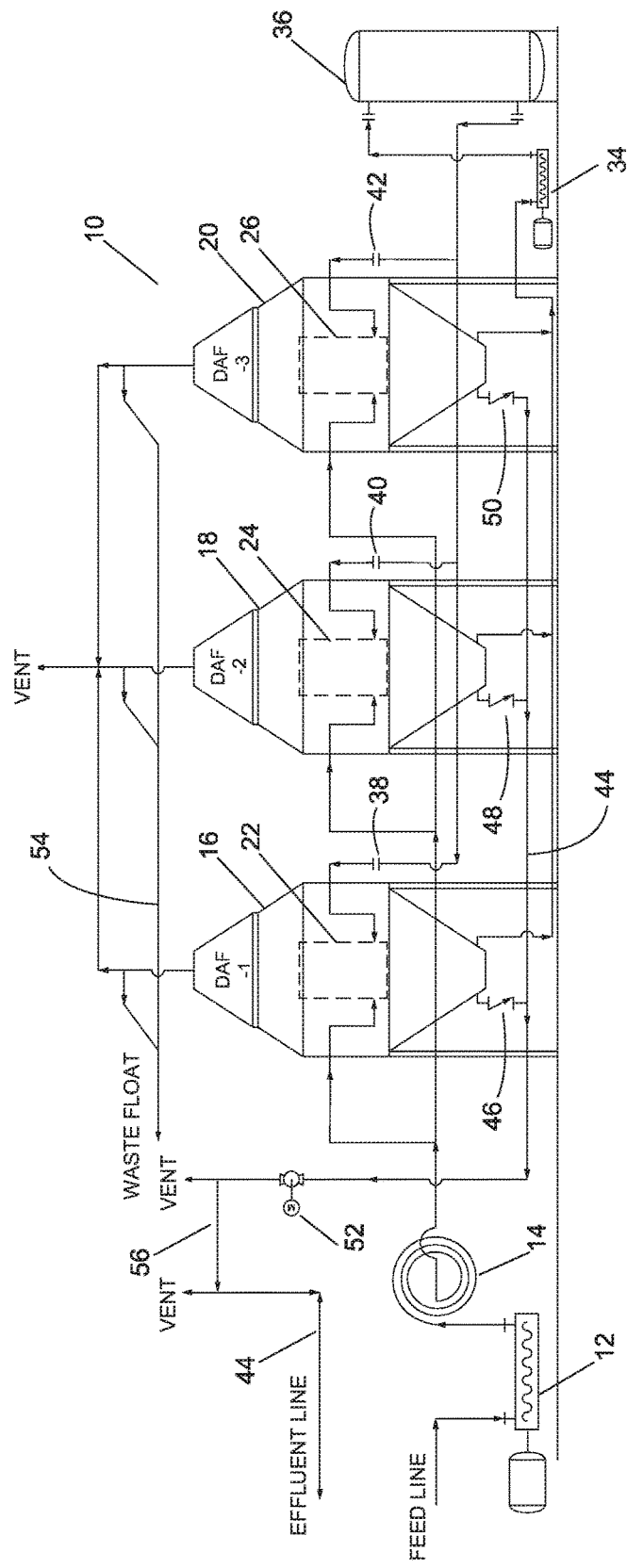
FIG. 2 illustrates schematically a system for treating high flowrate wastewater including two or more dissolved air flotation chambers in accordance with an embodiment of the present invention.
Figure 3:
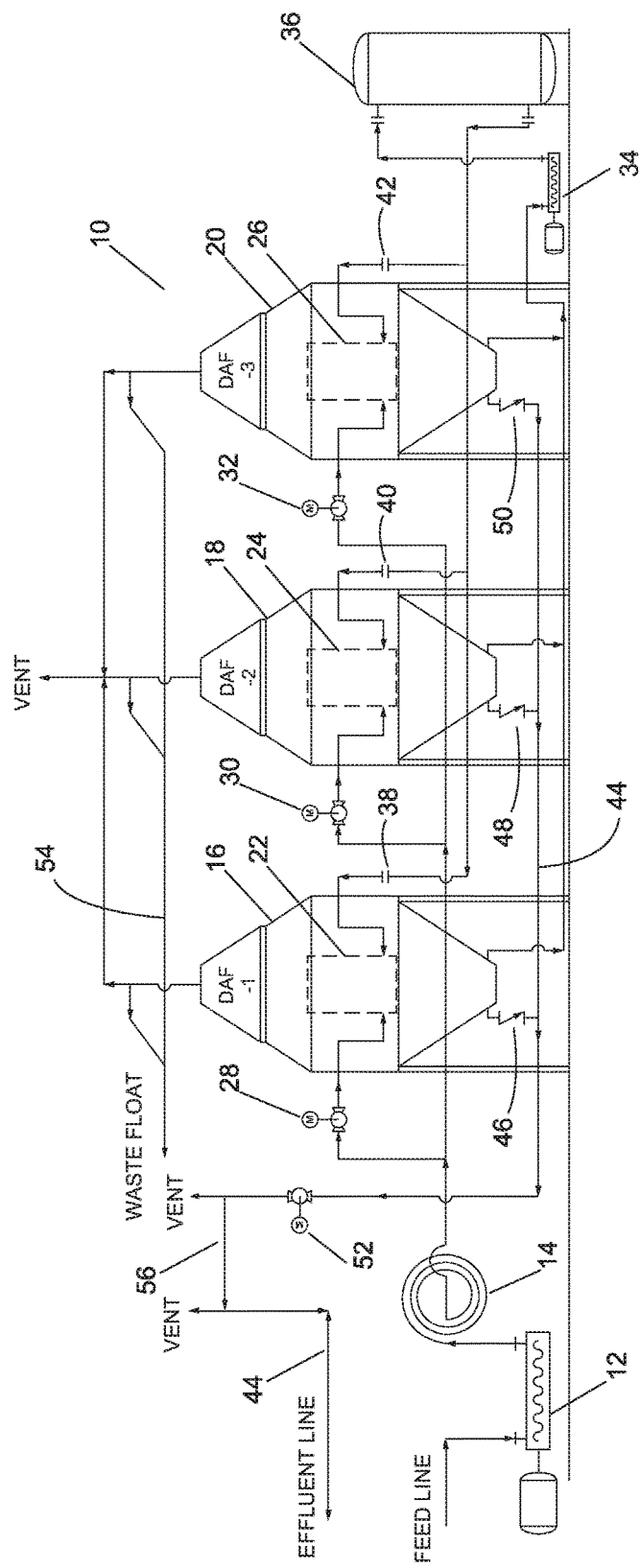
FIG. 3 illustrates schematically the system of FIG. 2 including inlet control valves at the feed line inlet branch to each dissolved air flotation chamber in accordance with an embodiment.

A simplified schematic illustration of the system 10 according to an embodiment is shown in FIG. 2. The components of the system 10 may include a feed pump 12, which according to an embodiment is a positive displacement pump, for feeding water or wastewater to be treated through the system, at least one pressurised flocculation chamber 14 for receiving the water or wastewater and configured to introduce coagulant and flocculant (not shown), and a plurality of dissolved air flotation (DAF) chambers or tanks (three chambers 16, 18 and 20 in the embodiment shown) each including a respective submerged contact chamber 22, 24 and 26. As shown in FIG. 3, each contact chamber may have associated input control valves 28, 30 and 32. The system 10 may further include a second positive displacement pump 34 for recirculating treated water from the bottom of each DAF chamber through a pressurised dissolver 36 (otherwise known as an "air saturator") and wherein air-saturated water is fed back into each contact chamber via a back pressure device 38, 40 and 42, an effluent line 44 through which treated water from the bottom of each DAF chamber is discharged via a non-return valve 46, 48 and 50, a further control valve 52 associated with the effluent line, and a waste float line 54 connected across the top of each DAF chamber through which float material from each DAF chamber is discharged. At times throughout this specification, the waste float line 54 will be referred to as a first discharge pipework, and the effluent line 44 will be referred to as a second discharge pipework.

Figure 4:
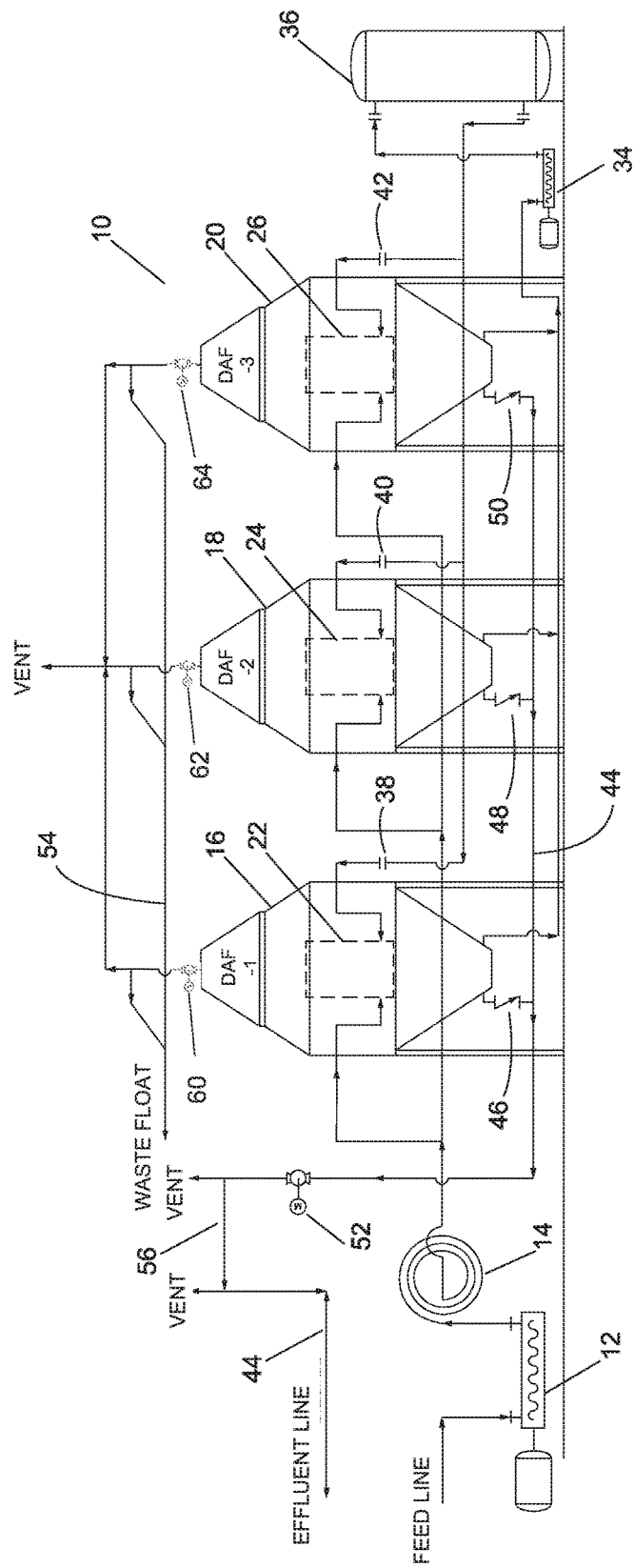
FIG. 4 illustrates schematically the system of FIG. 2 including an exit control valve at the float discharge line branch from each dissolved air flotation chamber in accordance with an embodiment.
Figure 5:
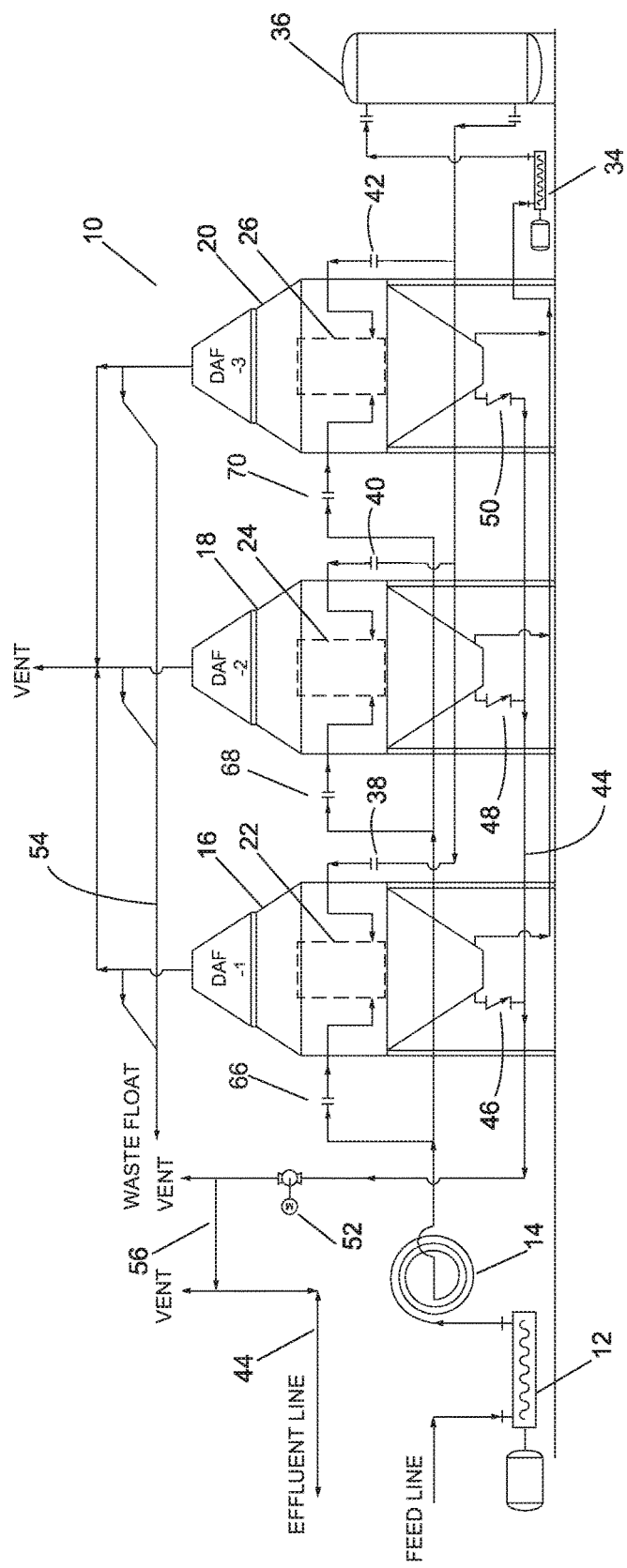
FIG. 5 illustrates schematically the system of FIG. 2 including back pressure devices at the feed line inlet branch to each dissolved air flotation chamber in accordance with an embodiment.
Figure 6:
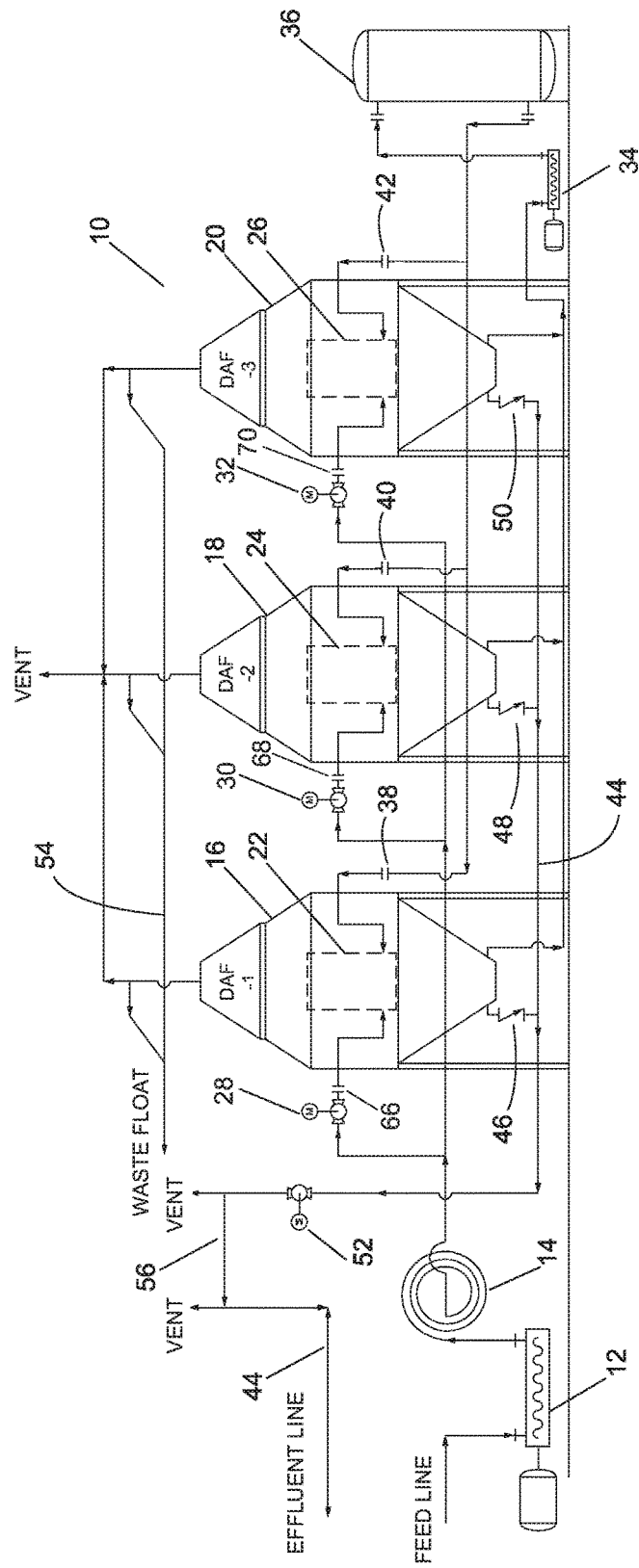
FIG. 6 illustrates schematically the system of FIG. 2 including an inlet control valve and a back pressure device at the feed line inlet branch to each dissolved air flotation chamber in accordance with an embodiment.

It is to be understood that whilst three separate DAF chambers are shown in the system of FIG. 2, any number of two or more DAF chambers could be utilised. It should also be noted that the inlet control valves 28, 30 and 32 shown in the FIG. 3 embodiment on the inlet lines could be replaced by exit control valves 60, 62 and 64 fitted as an alternative on the waste float discharge line 54 before the vent line and before they join into a single common float discharge line, as shown in the FIG. 4 embodiment. Still further, there may be applications which do not require the use of inlet control valves or exit control valves, but may require the use of back pressure devices 66, 68 and 70 on the branched inlet lines to each contact chamber to ensure uniform flow into each chamber, as shown in the FIG. 5 embodiment. Indeed, combinations of these features may well be utilised according to the specific application, and the embodiment of FIG. 6 as an example shows both inlet control valves 28, 30 and 32 together with back pressure devices 66, 68 and 70 in use. Whilst it appears that back pressure devices are present at the inlet and outlet to the dissolver 36, these are not back pressure devices but are merely to signify a flange connection and hence have not been referenced or described in detail.

The dissolved air flotation method of the present invention involves taking treated effluent from the DAF chambers 16, 18 and 20, saturating the effluent with air in the dissolver 36, and then introducing the air-saturated effluent back into the contact chambers 22, 24 and 26. When the pressurised dissolved air enters the chambers, it degasses, resulting in the formation of tiny bubbles in the contact chambers (as shown by example in FIGS. 1a-1d). The bubbles adhere to suspended matter in the water or wastewater feed, causing the suspended matter to float to the top of each DAF chamber forming a layer of float material which may be in the form of scum or froth.

The float material may be discharged using valve 52 on the effluent line 44. Those skilled in the art will appreciate that when this valve 52 is shut and water continues to be pumped into any one of the DAF chambers 16, 18 and 20, the level of water in each DAF chamber will rise because it can no longer flow downstream of valve 52. Thus, at the start of a treatment cycle, the automatic valve 52 may be shut, as described in more detail below, and a timer may be initiated to open the valve 52 after a preset period of time to allow treated water or wastewater to discharge. Valve 52 may be an automatic valve in this regard. In having the valve closed for a period of time, the water level in the DAF chamber rises and the float material is also discharged through line 54. Then, when the valve 52 opens again, the water level in each DAF chamber will slowly lower as effluent flows beyond valve 52 again, that is, until the original water level is reached again. In an embodiment, the water level in each tank is set by an uppermost section of pipework in the discharge line 44 through which vented water flows. In FIGS. 2-6 this section is referenced using numeral 56 and represents a pipe which veers horizontally from vertical pipework, however, other pipework arrangements for setting the level of water in each chamber may be utilised. The physical appearance of the above described pipework is not shown in FIGS. 2-6 but can be appreciated in the prior art FIGS. 1a-1d with inlet 124 being the equivalent to section 56 of the present system 10.

The apex or funnel shape at the top of each chamber shown in FIG. 2 may be incorporated to assist in directing float material up through each vertical branch extending from the top of each chamber to the waste float discharge line 54 as the liquid level in each chamber rises. The waste float discharge line may also be vented to avoid air locks. The advantage of this "funnel effect" is that all the scum material may be pushed off the top by the rising water rather than sticking to surfaces and causing water to flow under the float material. In using two or more DAF chambers as embodied in the present invention, the effectiveness of the "funneling effect" is not compromised as would otherwise be the case when increasing the cross sectional area and height of a single DAF tank.

According to an embodiment, the bottom of each chamber is also funnel shaped as shown in all of the Figures, and the recirculation line feeds the dissolver 36 from a bottom portion of the chamber. As an example, the prior art FIGS. 1a-1d show recirculation line pipework extending vertically downwardly from the very bottom of the chamber, however, other configurations may also be suitable. The funnel shape at the bottom of each DAF chamber ensures that any solids settling to the bottom of the tank are directed into the recirculation line leading to the dissolver 36 through operation of pump 34. The accumulation of suspended solids at the bottom of each chamber will have settled mostly in the time between processing cycles. In the period of time between cycles (which may be overnight in some instances), the suspended solids in the entire DAF chamber contents may settle to the bottom of the funnel shape in the DAF chamber. The recirculation pump 34 may run at the start of each cycle before feed pump 12 starts to ensure that the settled solids are re-circulated and floated before the effluent starts to discharge. Accordingly, the recirculation line may provide two benefits, the first being to ensure solid matter which has not floated to the top of each chamber but instead accumulated at the bottom is transferred back up into the contact chamber for removal, and for introducing air saturated water into each chamber as previously described.

A treatment cycle according to an embodiment of the present invention will now be described with reference to the physical embodiment shown in FIG. 3.

At the commencement of the cycle, inlet control valves 28, 30 and 32 on the feed lines to the DAF chambers 16, 18 and 20 may be opened. The control valve 52 on the effluent line 44 may be opened and the feed pump 12 may receive a signal and turn on. This allows effluent to discharge from each DAF tank 16, 18 and 20 via effluent line 44.

After a preset time, the inlet control valves 30 and 32 on the feed lines to DAF tanks 18 and 20 may be closed for a preset time at the same time as the effluent line control valve 52. This causes a rise in the water level in DAF chamber 16 and float material in that chamber to be pushed off the top through the float discharge pipe 54.

After a further preset time, the inlet control valve 30 on the feed line to the DAF chamber 18 may be opened and the inlet control valve 28 on the feed line to DAF chamber 16 may be closed for a preset time. This causes a rise in the water level in DAF chamber 18 and float material within that chamber is pushed off the top through the float discharge pipe 54.

After a further preset time, the control valve 32 on the feed line to the DAF chamber 20 may be opened and the control valve 30 on the feed line to DAF chamber 18 may be closed for a preset time. Float material is pushed off the top of DAF chamber 20 through the float discharge pipe 54.

After a further preset time, the inlet control valves 28 and 32 on feed lines to the DAF chambers 16 and 20 may be opened and the effluent control valve 52 opened. This allows effluent to discharge from each DAF chamber 16, 18 and 20 in the same way which occurred at the commencement of the cycle.

After a further preset time, the inlet control valves 28, 30 and 32 closing and opening sequence described above may be repeated. This sequence may continue until such time as the signal to turn off the feed pump 12 and recirculation pump 34 is received, at which time the control valve 52 on the effluent line is closed and float material is pushed off the top of the three DAF chambers 16, 18 and 20 for a preset time, after which time the pumps may be turned off.

In an embodiment, the inlet control valves 28, 30, 32 and control valve 52 include automatic timers for automatically opening and closing said valves in a controlled sequence.

It is to be understood that the above paragraphs describe but one possible sequence of float discharge, and the present invention is not intended to be limited to the discharge sequence of the described embodiment.

The use of two or more dissolved air flotation chambers configured such that the water level in each chamber is caused to rise and push off float material at preset times during a treatment cycle results in an efficient water/wastewater treatment system that is capable of handling high feed flow rates without the need to increase the size or height of a single-DAF chamber treatment facility. This makes the system ideal for use in environments with height and space restrictions and wherein water or wastewater requires treatment at high flowrates.

The back pressure devices 38, 40 and 42 mentioned above may be in the form of orifice plate assemblies whose function is to cause back pressure in the dissolver 36, and may be fitted before the dissolved air floatation tanks 16, 18 and 20 on branches off the main recirculating line as shown in FIGS. 2-6. This ensures a uniform flow of degassing water into each DAF chamber 16, 18 and 20 and also ensures degassing does not occur prematurely. The back pressure devices 66, 68 and 70 described above provide similar benefits, but for the purpose of providing uniform flow of incoming water or wastewater.

Non return valves 46, 48 and 50 may also be located on the effluent lines from each DAF chamber 16, 18 and 20 respectively before it joins in with the main effluent line 44 connected to the effluent control valve 52 to prevent water from flowing back from one tank to the other during the push off cycles.

Water or wastewater may be supplied to the tanks from a collection chamber which may be a separate tank, a flocculation chamber as per the embodiment shown, or a river or reservoir, depending on the application.

The flocculation chamber may be in the form of a flocculation coil in which a suitable coagulant such as aluminium sulphate is injected. In addition, a suitable polymer may be injected to flocculate suspended matter in the water or wastewater.

The system 10 may further include other water treatment facilitators such as chlorinators and the like (not shown).

Although not shown, the system 10 may include a suitable control means for controlling the operation of each of the pumps, the valve 52, and any other device in the system which may require automatic operation.

The person skilled in the art would now appreciate the various advantages of the system 10 embodying the present invention. The system 10 provides a means of treating water or wastewater at high flowrate without compromising the cross sectional size and height of the system and without compromising efficiency.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A water or wastewater treatment system or apparatus characterised by:
    two or more dissolved air flotation chambers each including a submerged contact chamber for directing water entering the contact chamber to the surface of the dissolved air flotation chamber;
    a first discharge pipework for float material associated with said two or more dissolved air flotation chambers;
    a feed pump means to move water or wastewater into each contact chamber at substantially equal flow rates via a feed line, wherein the water or wastewater entering the contact chambers via the feed line includes suspended matter;
    a pressurised dissolver for saturating water with air;
    a recirculation pump means to move treated water via a recirculation line from each of the dissolved air flotation chambers to the pressurised dissolver at substantially equal flow rates, and then back into the contact chambers, whereby air-saturated water from the dissolver degasses upon entry into the contact chambers and forms bubbles which adhere to said suspended matter causing the suspended matter to float to the surface of each chamber to form a layer of float material; and
    a second discharge pipework for treated water associated with said two or more dissolved air flotation chambers, said second discharge pipework including a control valve which when closed prevents flow of treated water from the dissolved air flotation chambers for a predetermined time to thereby cause a liquid level in the chambers to rise and said float material to be discharged through said first discharge pipework,
wherein said recirculation line branches into individual lines that feed each contact chamber with said air-saturated water, each said branched recirculation line including a flow restricting device enabling uniform flow into each contact chamber.

2. A system or apparatus as characterised in claim 1, wherein the feed line branches into separate lines that feed into each contact chamber, wherein each said branched feed line including a flow restricting device in the form of a back pressure device enabling uniform flow of water or wastewater into each contact chamber.

3. A system or apparatus as characterised in claim 2, wherein each said branched feed line includes an inlet control valve which when closed prevents flow of water or wastewater into the corresponding contact chamber, followed by said back pressure device enabling uniform flow of water or wastewater into each contact chamber, wherein when said control valve associated with the second discharge pipework is closed, the liquid level in each flotation chamber is caused to rise except for flotation chambers having a closed inlet control valve at the corresponding feed line branch.

4. A system or apparatus as characterised in claim 3, wherein each inlet control valve associated with a branched feed line includes an automatic timer for opening and closing the valves at preset times.

5. A system or apparatus as characterised in claim 4, wherein the control valve associated with the second discharge pipework includes an automatic timer for opening and closing the valve at preset times.

6. A system or apparatus as characterised in claim 5, wherein the automatic timer of the control valve associated with the second discharge line is configured such that:
after a preset time of the control valve associated with the second discharge pipework for treated water being open, the control valve associated with the second discharge pipework is closed, causing the liquid level in the chambers to rise and float material in the chambers to be discharged through the first float discharge pipework; and
after a further preset time, the control valve associated with the second discharge pipework is re-opened.

7. A system or apparatus as characterised in claim 6 wherein said feed pump means is in the form of a first positive displacement pump for pumping water or wastewater to said flotation chambers, and said recirculation pump means is in the form of a second positive displacement pump for recirculating treated water via the recirculation line from the dissolved air flotation chambers into the contact chambers via the dissolver.

8. A system or apparatus as characterised in claim 7, wherein prior to the positive displacement pumps being operated to discontinue operation, the control valve associated with the second discharge pipework for treated water is closed and the liquid level in all flotation chambers is caused to rise and float material in all chambers caused to be discharged through the first float discharge pipework.

9. A system or apparatus as characterised in claim 1, wherein when said control valve associated with the second discharge pipework is closed, the liquid level in each chamber is caused to rise.

10. A system or apparatus as characterised in claim 1, wherein said feed line includes a means of at least flocculating said water or wastewater prior to entry into said contact chamber.

11. A system or apparatus as characterised in claim 1, wherein the first discharge pipework includes individual branches from each dissolved air flotation chamber which join to form a single discharge line, and wherein an upper end of each flotation chamber has an inverted funnel shape to direct float material through said individual float discharge pipework branches.

12. A system or apparatus as characterised in claim 11, wherein said individual float discharge pipework branches are vented and extend substantially vertically from an apex of each flotation chamber and then outwardly and downwardly to enable said discharge before joining said single line, wherein the outward extension of the branch defines a minimum level at which float material is discharged, wherein each vertical extension has associated therewith an exit control valve, such that when an exit control valve is closed, and the control valve associated with the second discharge pipework is also closed, only the chamber/s having an open exit control valve at the corresponding float discharge pipework branch will see float material discharged.

13. A system or apparatus as characterised in claim 1, wherein said second discharge pipework for treated water includes a substantially vertical branch which is vented to atmosphere and a substantially horizontal branch extending from an upper end thereof which defines a liquid level in the chambers.

14. A system or apparatus characterised in claim 1, wherein said recirculation line extends from a bottom portion of each dissolved air flotation chamber, and said bottom portion includes a funnel shape to direct any suspended matter which accumulates in the bottom portion of the chamber into the recirculation line.

15. A system or apparatus as characterised in claim 14, wherein at the commencement of a treatment cycle, the recirculation pump means is operated prior to the feed pump means to ensure that suspended matter which was not directed to the surface of each flotation chamber in a previous cycle and which has accumulated at or towards the bottom of each flotation chamber is drawn into the recirculation line prior to treated water discharging from each flotation chamber.

16. A system or apparatus as characterised in claim 1 wherein said feed pump means is in the form of a first pump for pumping water or wastewater to said flotation chambers, and said recirculation pump means is in the form of a second pump for recirculating treated water via the recirculation line from the dissolved air flotation chambers into the contact chambers via the dissolver.

17. A system or apparatus as characterised in claim 16 wherein said first and second pumps are positive displacement pumps.

18. A treatment process for water or wastewater, said treatment process characterised by:
pumping water or wastewater including contaminants via a feed line to each of two or more dissolved air flotation chambers at substantially equal flow rates, each said chamber including treated water;
pumping said treated water from each of the two or more dissolved air flotation chambers to a pressurised dissolver at substantially equal flow rates, and then back into the two or more dissolved air flotation chambers, thereby feeding said chambers with air-saturated water from the dissolver which causes said contaminants to float towards a top surface of water in each chamber, thereby forming a layer of float material, each chamber including a minimum discharge level above the top surface of water defining a height at which rising float material will exit each chamber into first discharge pipework;

discharging treated water from each chamber via a second discharge pipework for treated water; and discharging said float material by providing at least one discharge control valve at said second discharge pipework for treated water, and closing the at least one discharge control valve for a period of time during said treatment cycle to thereby prevent said discharge of treated water from the chambers and cause the water level in the chamber to rise above said minimum discharge level causing said float material to be discharges through said first discharge pipework, wherein said recirculation line branches into individual lines that feed each contact chamber with said air-saturated water, each said branched recirculation line including a flow restricting device enabling uniform flow into each contact chamber.

19. A treatment process as characterised in claim 18, further including:

after a preset time of the control valve associated with the second discharge pipework for treated water being open, closing the control valve associated with the second discharge pipework, causing the liquid level in the chambers to rise and float material in the chambers to be discharged through the float discharge pipework; and after a further preset time, re-opening the control valve associated with the second discharge pipework for treated water.

20. A treatment process as characterised in claim 19, further including repeating the treatment process until such time that a signal is transmitted to a first positive displacement pump responsible for pumping water or wastewater through to said chambers and a second positive displacement pump responsible for recirculating water via said dissolver, to discontinue operation of the pumps.

21. A treatment process as characterised in claim 20, further including, when said signal is transmitted to the positive displacement pumps and prior to the pumps discontinuing operation, closing the control valve associated with the second discharge pipework for treated water to thereby cause the liquid level in all chambers to rise and float material in all chambers to be discharged through the first discharge pipework, and then discontinuing operation of the feed pump.

22. A treatment process as characterised in claim 20 wherein pumping treated water to the pressurised dissolver is performed at the commencement of a treatment cycle prior to pumping water or wastewater to the dissolved air flotation chambers, to ensure that suspended matter which was not directed to the surface of the chambers in a previous treatment cycle and which has accumulated at or towards the bottom of the chambers is drawn into the recirculation line prior to treated water discharging from each chamber.

* * * * *